United States Patent Office 2,765,334
Patented Oct. 2, 1956

2,765,334

PRODUCTION OF SYM-HOMOPINIC ACID

James S. Stinson and Ray V. Lawrence, Lake City, Fla., assignors to the United States of America as represented by the Secretary of Agriculture No Drawing. Application December 11, 1953,
Serial No. 397,803

7 Claims. (Cl. 260—514)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention provides an improved process for converting pinonic acid to sym-homopinic acid. Sym-homopinic acid is a solid $C_{10}$ dicarboxylic acid containing a relatively stable dimethylated cyclobutyl group. It is useful in the synthesis of a variety of organic compounds and readily forms esters which are valuable as plasticizers, lubricants, and the like.

In what appears to be the only method heretofore reported for the conversion of pinonic acid to sym-homopinic acid, the conversion required oxidation and esterification to produce diethyl norpinate, reduction to produce the corresponding glycol, halogenation to produce the corresponding dibromide, cyanolation to produce the corresponding dinitrile, and saponification to produce sym-homopinic acid.

We have discovered that pinonic acid can be converted to sym-homopinic acid in two reactive steps by (1) reacting pinonic acid with a composition of the group consisting of aqueous solutions of ammonium sulfides and mixtures of liquid amines and sulfur and (2) saponifying the reaction products and isolating the homopinic acid produced.

Illustrative examples of suitable aqueous ammonium sulfides include the solutions of ammonium mono and poly sulfides. Examples of suitable liquid amines containing sulfur include suspensions of relatively finely divided sulfur, in any of its reactive crystalline modifications, in: a heterocyclic amine such as morpholine, piperidine, or pyridine; an aromatic amine such as aniline, or the toluidines; an aliphatic amine such as hexylamine, dibutylamine or tripropylamine; an alicyclic amine such as cyclohexylamine or dicyclohexylamine; or, a quaternary amine such as choline, and the like. Substantially anhydrous liquid saturated heterocyclic amines containing a secondary amino group in the ring, such as morpholine, piperidine and the like, containing suspended particles of rhombic sulfur, of relatively small particle size, are particularly suitable reactants.

The reaction of the pinonic acid with the sulfur and amino groups can suitably be conducted, under sub, normal or super atmospheric pressure, at a temperature ranging from a temperature at which the reactants are solids to a temperature at which the reactants or reaction products undergo appreciable thermal decomposition. The reaction is preferably conducted at about atmospheric pressure at about the boiling point of the liquid containing the sulfur and amino groups.

The ratio in which the respective reactants are combined can suitably be varied widely, but the use of amounts providing from about 1½ to 2½ atoms of sulfur and from about 1½ to 2½ amino groups per molecule of pinonic acid are preferred.

The product produced by reacting pinonic acid with the sulfur and amino groups can suitably be saponified by substantially any of the conventional procedures for the saponification of compounds which are reactive with aqueous bases. The use of an aqueous solution containing at least one alkali metal hydroxide or alkaline earth metal hydroxide in an amount slightly in excess of that is necessary to convert the reaction product to the neutral salt of sym-homopinic acid is preferred.

The hym-homopinic acid can suitably be isolated from the saponification mixture by the conventional procedures for isolating a dibasic acid from a basic aqueous solution. One suitable method comprises extracting any neutral by-products by selectively dissolving them in a water immiscible liquid solvent, such as an ether, hydrocarbon, or the like, then acidifying the remaining aqueous phase, preferably with a mineral acid, such as sulfuric, phosphoric, or the like, and extracting the sym-homopinic acid from the acidified aqueous phase with a volatile water immiscible liquid solvent, such as an ether, hydrocarbon, or the like.

The isolated sym-homopinic acid can suitably be purified by a wide variety of procedures. For example the crude acid can be decolorized by contacting it with a solid adsorbent material, such as an activated carbon, and recrystallized from a suitable solvent, such as water. Alternatively, the crude acid can be subjected to a vacuum fractional distillation and/or recrystallized from an organic solvent such as a liquid hydrocarbon, ketone, ether, or the like. Since the acid is stable to the common oxidizing agents, it can also be purified by oxidizing the impurities with a suitable oxidizing agent such as potassium permanganate.

The pinonic acid starting material can suitably be pure or mixed with widely varying amounts of substantially any components which are relatively inert toward sulfur and amino groups. Pinonic acids of at least about 90% purity produced by the permanganate or ozone oxidation of alpha pinene are particularly suitable starting materials.

The following examples are illustrative of details of the invention:

EXAMPLE 1

368 g. (1.88 moles) of pinonic acid (94%) was mixed with 128 g. (4.00 gram atoms) of sulfur, and 348 mls. (4.00 moles) of technical grade morpholine. The mixture was refluxed for 16 hours. An oxothermic reaction occurred shortly after heating and the pot temperature rose as high as 150° in some cases. Later, the temperature dropped and was held at reflux temperature (128°). In the early part of the runs, a crystalline material was collected in the condenser. This material was found to be mostly morpholine carbonate, and was, evidently, originally present in the morpholine.

After cooling, 285 g. technical sodium hydroxide in 1 liter of water was added, and the resulting solution was refluxed overnight. After cooling, two extractions with other were made to remove neutral material. The remaining aqueous solution was slowly acidified to a pH of 2 with 1:1 sulfuric acid. Exhaust fumes were bubbled through sodium hydroxide solution to absorb gases evolved. After cooling, the crude acids were extracted with 3 portions of ether. The combined ether extract was washed with saturated sodium sulfate solution, dried over anhydrous sodium sulfate, and filtered. The ether was evaporated and the crude acids dried at 60–70° in vacuo. The crude product was weighed and the neut. equiv. was determined electrometrically in an aqueous solution. 384 g. of crude product, neut. equiv.: 116 was obtained; marvel and Rands analysis (JACS 72, 2642, 1950) showed that 93% of the total equivalents of acid was sym-homopinic acid and an overall yield of 82% was obtained (1.54 moles sym-homopinic acid from 1.88 moles of pinonic acid charged).

EXAMPLES 2–11

One-tenth mole samples of pinonic acid (18.4 g.) were reacted at reflux temperature for the specified time with the amounts of morpholine and sulfur shown in Table I. The products were saponified, the acids isolated and analyzed as described in Example 1.

Table I.—*Effect of various amines on the yield of sym-homopinic acid*

[0.10 mole pinonic acid [a], 0.20 mole amine and 0.20 gram atomic weight sulfur]

| Amine | Reaction Temp., °C.[b] | Reaction Time (Hrs.) | Wt. "Acids," Gms. | Neut. Equiv. | Total Milliequiv. Acids | Marvel-Rands Analysis | | Percent Yield [d] |
|---|---|---|---|---|---|---|---|---|
| | | | | | | Percent Monobasic [c] | Percent Homopinic [c] | |
| Aniline | 128 | 16 | 10.6 | 220 | 48.2 | 56 | 24 | 5.8 |
| Cyclohexylamine | 128 | 16 | 11.2 | 303 | 36.4 | 23 | 76 | 13 |
| Di-n-butylamine | 128 | 16 | 18.4 | 176 | 104.2 | 44 | 36 | 20 |
| Do | 159 | 6 | 17.3 | 172 | 100.4 | 46 | 39 | 21 |
| Do | 159 | 9 | 18.2 | 168 | 108.0 | 58 | 41 | 24 |
| n-hexylamine | 129 | 16 | 7.7 | 199 | 38.7 | 53 | 45 | 9.3 |
| Morpholine | 128 | 16 | 17.5 | 127 | 138.0 | 1 | 90 | 66 |
| Piperidine | 109 | 24 | 17.5 | 139 | 126.0 | 8 | 82 | 55 |
| Pyridine | 115 | 20 | 16.7 | 179 | 93.3 | 68 | 25 | 12 |
| Tri-n-butylamine | 216 | 5 | 13.3 | 227 | 58.8 | 90 | 8 | 2.4 |
| Do | 128 | 16 | 19.2 | 180 | 106.6 | 64 | 21 | 12 |

[a] Crude acid used was 94% by weight pinonic acid.
[b] Reaction temperatures other than the reflux temperature of the amine were effected by a constant temperature oil bath.
[c] Based on percent of total titer present in this peak.
[d] Millimoles sym-homopinic acid per 100 millimoles pinonic acid charged.

EXAMPLES 12–21

One-tenth mole samples of pinonic acid (18.4 g.) were reacted, using the times, temperatures, and amounts of morpholine and sulfur shown in Table II. The products were saponified, and the acids were isolated and analyzed as described in Example 1. Data on the products and yields are given in Table II.

0.82 g. of crude acids, neut. equiv.: 242, total milliequiv. of acids: 3.38. A sample analyzed by Marvel and Rands (9) method showed 73% of the acid present was sym-homopinic acid, and an overall yield of 13.3% (1.24 millimoles per 9.4 millimoles pinonic acid charged).

EXAMPLE 23

One-tenth mole of pinonic acid (18.4 g.), 0.20 gram atomic weight of sulfur (6.4 g.) and 0.20 mole of choline (24.2 g.) were reacted by refluxing in 100 mls. dioxane (B. P. 101°) for 24 hrs. After cooling, a solution of 20 g. sodium hydroxide in 80 ml. water was added and the mixture saponified by refluxing 16 hrs. Acidification, extraction and concentration of the crude acid product gave 17.8 g. with neutral equivalent 170; indicating 104.7 milliequivalents of acid present. Marvel and Rands chromatographic method of analysis showed 61% (per- Table II.—*Effect of some variables on the yield of sym-homopinic acid*

| Reaction Time (Hrs.) | Moles per 0.10 moles of Pinonic Acid [a] | | Crude Product, Gms. | Neut. equiv. | Total Milliequiv. Acids | Marvel-Rands Analysis | | Percent Yield [c] |
|---|---|---|---|---|---|---|---|---|
| | Morpholine [e] | Sulfur [f] | | | | Percent Monobasic [b] | Percent Homopinic [b] | |
| 8 | 0.20 | 0.20 | 18.7 | 135 | 138.6 | 12 | 84 | 62 |
| 16 | 0.20 | 0.10 | 18.1 | 139 | 129.7 | 31 | 64 | 45 |
| 16 | 0.20 | 0.15 | 18.5 | 128 | 145.4 | 8 | 83 | 64 |
| 16 | 0.20 | 0.20 | 17.5 | 127 | 138.0 | 1 | 90 | [d]66 |
| 16 | 0.20 | 0.25 | 18.7 | 139 | 135.0 | 4 | 88 | 63 |
| 16 | 0.20 | 0.30 | 18.6 | 169 | 109.2 | 13 | 75 | 44 |
| 16 | 0.20 | 0.40 | 12.0 | 184 | 65.2 | 4 | 85 | 30 |
| 63 | 0.20 | 0.20 | 17.0 | 122 | 140.0 | 2 | 95 | 71 |
| 16 | 0.30 | 0.20 | 17.3 | 119 | 145.4 | 5 | 87 | 67 |
| 16 | 0.10 | 0.20 | 18.2 | 154 | 118.6 | 37 | 47 | 30 |

[a] Crude acid used was 94% by weight pinonic acid.
[b] Based on percent of total titer present in this peak.
[c] Millimoles sym-homopinic acid formed per 100 millimoles pinonic acid charged.
[d] When these conditions were duplicated on a large scale using 1.88 moles of pinonic acid, a yield of 82% was obtained.
[e] Reaction temperature approximately 128°, reflux temperature of morpholine.
[f] Gram atomic weights of sulfur.

EXAMPLE 22

1.84 g. pinonic acid was placed in a constricted tube and 0.64 g. sulfur and 9.2 g. ammonium sulfide (hydro) solution (8.8% $H_2S$, 10.4% $NH_3$) was added. After slight heating to expel the air, the tube was sealed and placed in a constant temperature oil bath (150°) for 16 hours. Saponification of the reaction product gave cent of total titer) was monobasic and 27% was sym-homopinic acid. A 15% yield of sym-homopinic acid was obtained (millimoles sym-homopinic acid per 100 millimoles pinonic acid charged).

We claim:

1. A process of producing sym-homopinic acid, comprising, reacting pinonic acid with a composition of the group consisting of an aqueous solution of an ammonium sulfide and a mixture of a liquid amine and sulfur, saponifying the reaction product, acidifying the saponification products and isolating the homopinic acid produced.

2. A process of producing an alkali metal salt of sym-homopinic acid, comprising, reacting pinonic acid with a composition of the group consisting of an aqueous solution of an ammonium sulfide and a mixture of a liquid amine and sulfur, and saponifying the reaction product by reacting it with an aqueous alkali metal hydroxide.

3. A process of producing sym-homopinic acid, comprising, reacting pinonic acid with an amount of a mixture of a substantially anhydrous liquid amine with sulfur providing from about 1½ to 2½ atoms of sulfur and from about 1½ to 2½ amino groups per molecule of pinonic acid, and saponifying the reaction product, by reacting it with aqueous sodium hydroxide, acidifying the saponification products and isolating the homopinic acid produced.

4. A process of producing sym-homopinic acid, comprising, reacting pinonic acid with a mixture of a substantially anhydrous saturated heterocyclic amine containing a secondary amino group in the ring and sulfur, saponifying the reaction product, acidifying the saponification products and isolating the homopinic acid produced.

5. The process of claim 3 in which the amount of amino and sulfur used provides from about 1½ to 2½ atoms of sulfur and from about 1½ to 2½ amino groups per molecule of pinonic acid.

6. The process of claim 4 in which the amine used is morpholine.

7. The process of claim 4 in which the amine used is piperidine.

References Cited in the file of this patent

Carmack et al.: Organic Reactions, vol. III, pp. 83–107 (1946).